United States Patent
Fowler et al.

(10) Patent No.: US 6,683,772 B2
(45) Date of Patent: Jan. 27, 2004

(54) LIGHTNING SUPPRESSION APPARATUS FOR USE WITH COAXIAL CABLE AND HELIAXIAL CABLE

(76) Inventors: William J. Fowler, 2162 Gulf Terminal Dr., Houston, TX (US) 77023; Benjamin P. Fowler, 2162 Gulf Terminal Dr., Houston, TX (US) 77023

( * ) Notice: Subject to any disclaimer, the term of this patent is extended or adjusted under 35 U.S.C. 154(b) by 278 days.

(21) Appl. No.: 09/882,426

(22) Filed: Jun. 18, 2001

(65) Prior Publication Data

US 2002/0171989 A1 Nov. 21, 2002

Related U.S. Application Data

(63) Continuation-in-part of application No. 09/855,355, filed on May 15, 2001.

(51) Int. Cl.[7] .................................................. H02H 9/06
(52) U.S. Cl. ........................................... 361/117; 174/2
(58) Field of Search ........................ 361/117–119, 212, 361/216, 217, 220; 336/61, 70, 90, 96, 186; 379/443, 451; 333/12, 81 R; 174/1–3, 6, 7, 17 R, 175 F, 25 R, 27, 32, 35 CE, 38, 50.52, 51, 52.1, 52.2, 98, 99 R, 130, DIG. 14, DIG. 17

(56) References Cited

U.S. PATENT DOCUMENTS

| 1,138,186 | A | * | 5/1915 | Brach .............................. 174/6 |
| 3,380,004 | A | * | 4/1968 | Hansen ......................... 333/184 |
| 5,167,537 | A | | 12/1992 | Johnescu et al. ............ 439/620 |
| 5,844,766 | A | | 12/1998 | Miglioli ....................... 361/119 |
| 6,128,470 | A | * | 10/2000 | Naidu et al. .................. 455/16 |
| 6,278,599 | B1 | * | 8/2001 | Gasque, Jr. .................. 361/117 |

* cited by examiner

*Primary Examiner*—Ronald W. Leja
(74) *Attorney, Agent, or Firm*—Harrison & Egbert

(57) ABSTRACT

A system for suppressing the effects of lightning including an antenna, a cable extending from the antenna, an enclosure having an interior volume, a coil of conductive wire received within the interior volume of the enclosure, and a piece of electronic equipment suitable for receiving from or transmitting through the antenna. The electronic equipment is interconnected to a lead from the coil of conductive wire. The coil of conductive wire has another lead connected to the cable. The cable is a coaxial cable or a heliaxial cable. A conductive grit or steel shot fills a portion of the interior volume of the enclosure around the coil of conductive wire. A grounding rod is electrically interconnected to at least one of the cables, the enclosure and the electronic equipment.

18 Claims, 4 Drawing Sheets

LIGHTNING SUPPRESSION APPARATUS FOR USE WITH COAXIAL CABLE AND HELIAXIAL CABLE

CROSS REFERENCE TO RELATED APPLICATIONS

The present application is a continuation-in-part of U.S. patent application Ser. No. 09/855,355, filed on May 15, 2001, and entitled "LIGHTNING SUPPRESSION ATTENUATOR AND SYSTEM EMPLOYING SAME", presently pending.

BACKGROUND OF THE INVENTION

1. Field of the Invention

The present invention relates to lightning suppression attenuators. More particularly, the present invention relates to lightning suppression devices that can be used so as to cushion the effects of lightning strikes. More particularly, the present invention relates to lightning suppression devices that prevent the effects of lightning from affecting equipment connected to coaxial cable extending to antennas.

2. Description of Related Art

Lightning conceivably may have provided humankind with a first source of fire, but lightning has otherwise been a destructive force throughout human history. Strategies and apparatus for reducing the likelihood of damage by lightning are fairly old, including, for instance, lightning rods that have been use for approximately 200 years. While the use of such rods and other precautionary steps and safety devices reduce the damage and injury that would otherwise result from lightning today, it remains an enormously dangerous natural phenomenon that claims hundreds of lives worldwide every year and destroys a substantial amount of property. Somewhat paradoxically, advances in other areas of technology have increased, rather than diminished, the damaged caused by lightning. This is because relatively low voltage and current levels can damage integrated circuits and other modem electronic components, with the result that many electronic devices are more susceptible to lightning damage today than ever before. Many devices to which microprocessors technology has been added are more susceptible to lightning damage as a result of such improvements. Additionally, lightning is capable of inducing substantial currents not only in electrical circuits directly struck by it but also in circuits located within the magnetic field induced by a nearby lightning strikes, giving each strike enormous destructive potential.

One of the most common areas of lightning strikes are large telecommunications and camera towers that extend upwardly from the earth. Typically, such towers include an electronic device at the top which serves to transmit or receive information. Since lightning will follow a path of least resistance on its way to the earth, the towers are very attractive to lightning. It is well known that lightning is particularly attracted to areas of positive ions and is repelled by areas of negative ions. Since the electronic devices at the top of towers often operate on AC power, an attractive source of positive ions is generated at the top of the tower.

Whenever lightning strikes a tower, an enormous amount of damage is created. Typically, the electronic device at the top of the tower is completely destroyed by the lightning. Furthermore, the structure of the tower and other associated electronics at the top of the tower can become damaged. Repair efforts on the tower are often time consuming and expensive. Typically, complete replacement of the electronic device at the top of the tower is required. As such, it is very important to develop a device which resists or prevents lightning strikes.

A major problem related to lightning strikes occurs when the lightning strikes a radio, television, or other transmitting and receiving antenna. Typically, these antennas will have coaxial or heliaxial cable extending therefrom. When a lightning strike occurs, the electrical surge will pass through the central conductor of the coaxial cable and also along the conductive shield of the coaxial cable. Ultimately, the lightning wavefront will pass along the coaxial cable to the electronic equipment associated with the broadcasting or receiving operation. As a result, a great deal of damage can occur to such equipment. Conventionally, in the past, a varistor has been connected between the coaxial cable and the antenna and the electronic equipment. Although the varistor can reduce some of the effects of the lightning surge, it has been found generally ineffective in preventing the full and strong effects of the electrical surge from the lightning from affecting the electronic equipment. After a lightning strike, it is often necessary to replace the varistor because of the damage absorbed by the varistor.

In the past, various patents issued relating to such lightning suppression systems. U.S. Pat. No. 5,844,766, issued on Dec. 1, 1998 to L. Miglioli, describes a lightning suppression system for tower-mounted antenna systems. This system includes a directional coupler, a quarter-wavelength stub, a first cylindrical capacitor, a second cylindrical capacitor and a lightning suppression circuit. Each of the cylindrical capacitors has an inner conductor element, an outer conductive tube and a dielectric material. The direction coupler acts to block direct current at low frequency signals from passing therethrough. The quarter-wavelength stub comprises a helicoid and acts to reflect radiofrequency signals back to the transmission line while allowing direct current and low frequency signals to flow therethrough. The first cylindrical capacitor and the second cylindrical capacitor combine to form a low pass filter which allows direct current and low frequency signals to flow through while blocking other signals. The lightning suppression circuit suppresses high voltage direct current and low frequency signals such as those produced by near lightning strikes.

U.S. Pat. No. 5,167,537, issued on Dec. 1, 1992, to Johnescu et al., describes a high density contact assembly capable of low working voltage and high energy handling capacity, including lightning suppression. The contact assembly employs a multi-layered varistor as the transient suppression device. The varistor is mounted in a notch in the contact and connected to ground by way of a ground sleeve. An insulator sleeve separates the ground sleeve from the contact. Both the insulator sleeve and the ground sleeve include a gap or groove extending the length of the sleeve to permit the sleeves to be snapped onto the contact and aligned without the need for additional adhesive staking operations.

U.S. Pat. No. 5,694,286, issued on Dec. 2, 1997 to the present inventor, describes a lightning protection apparatus having a tower which is grounded grounded to the earth, an electronic device mounted onto the area adjacent a top of the tower, and a negative ion production device electrically connected to the top of the tower. The negative ion production device serves to produce solely negative ions around and over the electronic device. An auger rod engages the earth so as to be conductively connected to the earth, and an electrical line serves to connect the auger rod to the tower. A shield member is connected to the tower and extends over the electronic device. The negative ion production device is connected to the shield member so as to pass negative ions through the shield member. The negative ion production device can be one or more batteries that are connected together and have a negative terminal connected to the tower and a positive terminal connected to the electronic device.

It is an object of the present invention to provide a lightning suppression system which prevents lightning strikes from adversely affecting radio, television or other transmitting and receiving equipment.

It is another object of the present invention to provide a lightning suppression system which cushions the effects of lightning strikes upon coaxial or heliaxial cable.

It is still object of the present invention to provide a lightning suppression system which will cushion the effects of lightning from destroying the varistor connected to the electronic equipment.

It is a further object of the present invention to provide a lightning suppression system which lightning suppression system which is easy to install, relatively inexpensive and easy to manufacture.

These and other objects and advantages of the present invention will become apparent from a reading of the attached specification and appended claims.

SUMMARY OF THE INVENTION

The present invention is a system for suppressing the effects of lightning comprising an antenna, a cable extending from the antenna, an enclosure having an interior volume, a coil of conductive wire received within the interior volume of the enclosure, and an item of electronic equipment suitable for receiving from or transmitting through the antenna. The coil has a first lead and a second lead extending outwardly of the enclosure. The first lead is connected to the cable extending from the antenna. The second lead is connected to the electronic equipment. A conductive grit fills a portion of the enclosure. This conductive grit is steel shot.

A grounding rod is electrically connected to the cable, the enclosure and to the electronic equipment. The grounding rod includes a central shaft and a plurality of vanes extending radially outwardly from the central shaft. The central shaft and the plurality of vanes are formed of a conductive material.

The cable is a coaxial or heliaxial cable having a central conductor and an outer conductive shield. The coaxial cable has a connector affixed to an end thereof. The coil of conductive wire is a coaxial or heliaxial line affixed to the connector of the cable. A conductive line is interconnected to the connector of the cable and to the grounding rod. A varistor is connected to the second lead of the coil. The electronic equipment is connected to the varistor.

The grounding bus has a first conductive line connected to the cable, a second conductive line connected to the enclosure and a third conductive line connected to the electronic equipment. The grounding rod has a conductive line connected to the grounding bus. The varistor also has a conductive line connected to the grounding bus.

When a lightning strike occurs, the lightning wavefront will travel around the central conductor and the outer conductive shield of the coaxial cable. This will pass along the coil of conductive wire within the enclosure. The relationship between the coil of conductive wire and the conductive grit within the enclosure will act as a polyphaser suppressor so as to absorb the shock of the lightning, to cushion the effects of the lightning and to dump the lightning to ground.

DETAILED DESCRIPTION OF THE INVENTION

Figure 1:
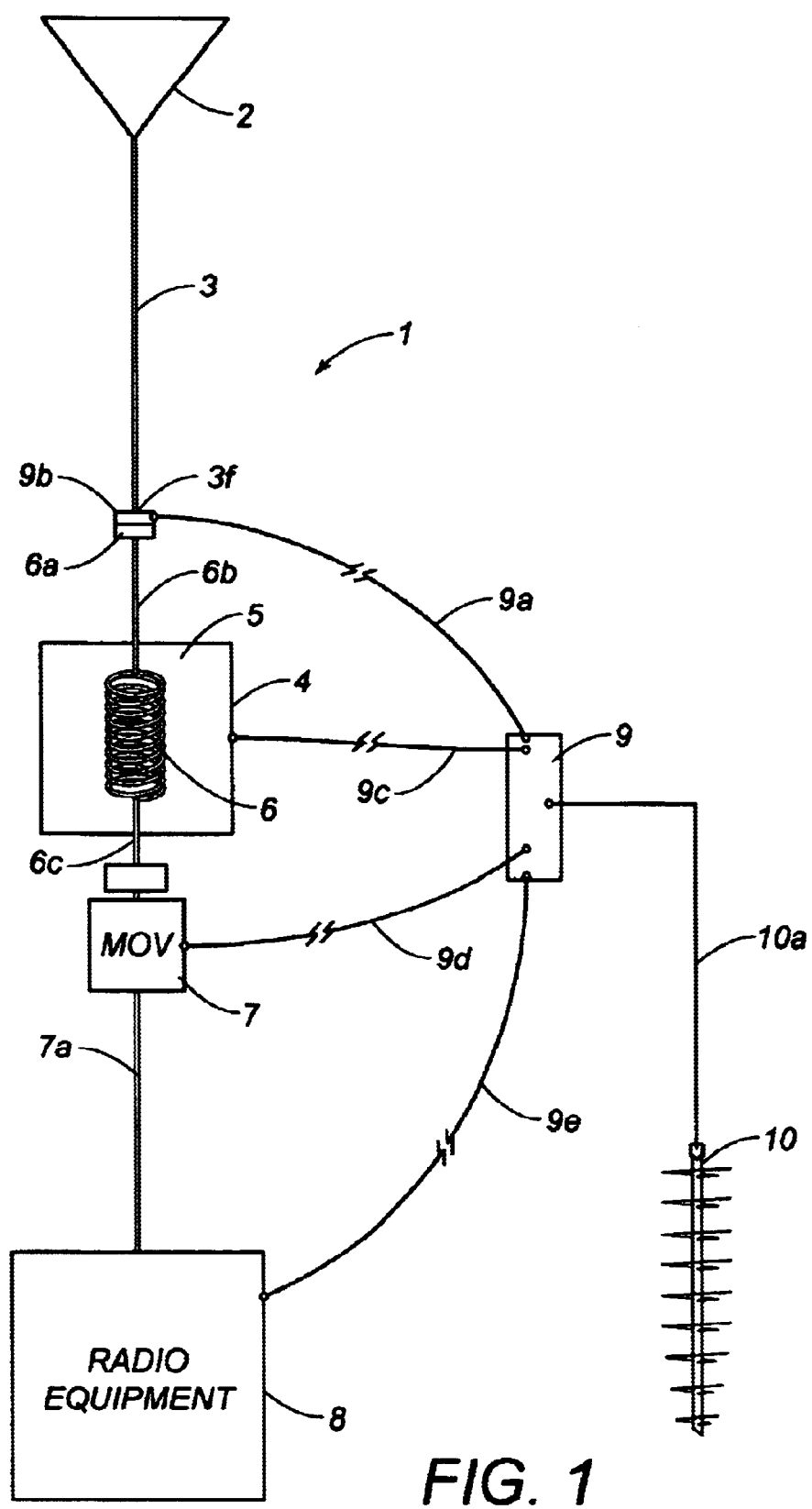
FIG. 1 is a diagrammatic illustration of the lightning suppression system in accordance with the teachings of the present invention.

Referring to FIG. 1, there is shown at 1 the lightning suppression system in accordance with the teachings of the present invention. The lightning suppression system 1 includes an antenna 2, a cable 3 extending from the antenna, an enclosure 4 having an interior volume 5, a coil of conductive wire 6 received within the interior volume 5 of the enclosure 4, a metal oxide varistor 7, and electronic equipment 8. A grounding bus 9 is connected by electrical line 9a to a connector 9b of the cable 3. The grounding bus 9 has another conductive line 9c connected to the enclosure 4. The grounding bus 9 has another conductive line 9d connected to the varistor 7. Finally, the grounding bus 9 has a conductive line 9e connected to the electronic equipment 8. A grounding rod 10 is connected by conductive line 10a to the grounding bus 9.

Figure 2:
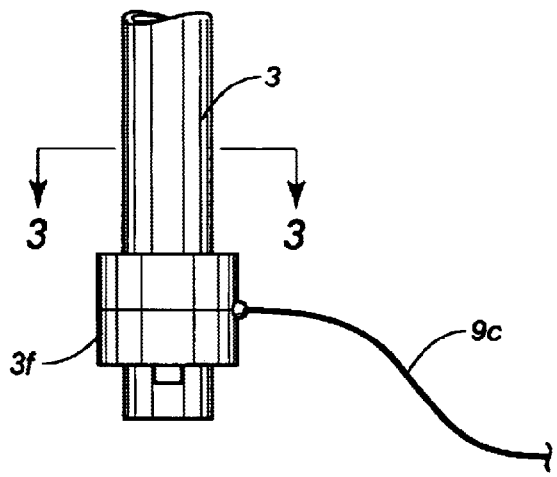
FIG. 2 is an enlarged view of the connector of the coaxial cable.
Figure 3:
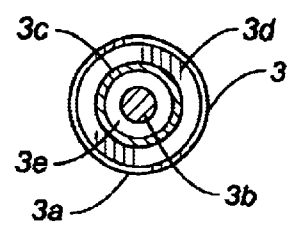
FIG. 3 is a cross-sectional view taken across lines 3—3 of FIG. 2.

In the present invention, the antenna 2 is a transmitting and receiving antenna. The antenna 2 can be a conventional panel antenna. Typically, the antenna 2 will be in a position which is susceptible to lightning strikes. A coaxial or heliaxial cable 3 extends from the antenna 2. The coaxial cable 3 is illustrated, with particularity, in FIG. 3. Coaxial cable 3 has an outer jacket 3a, an inner conductor 3b, and a conductive shield 3c. In normal use, the signal will come through the center conductor 3b and return through the conductive shield 3b. A layer of insulating material 3d is interposed between the outer jacket 3a and the conductive shield 3c. Another layer of conductive material 3e is interposed between the exterior of the central conductor 3b and the interior of the conductive shield 3c. FIG. 2 shows that a connector 3f is affixed to the end of the cable 3 so as to allow the coaxial cable 3 to be interconnected to another cable. The connector 3f is a typical copper connector. It can be seen that line 9a is affixed to the copper connector 3f so as to extend to the grounding bus 9.

Referring again to FIG. 1, the connector 3f is affixed to a connector 6a associated with the coil of conductive wire 6. The coil of conductive wire is also coaxial or heliaxial cable. In the preferred embodiment of the present invention, the coil of conductive wire 6 will be RG-8 coax cable or supo-flex cable. The coil of conductive wire 6 has a first lead 6d which is connected to the connector 6a and extends outwardly of the enclosure 4. The coil of conductive wire 6 also has a second lead 6c which extends outwardly of the enclosure 4 and is connected to the metal oxide varistor 7. As will be described hereinafter, a conductive grit will fill at least a portion of the interior volume 5 of the enclosure 4.

The varistor 7 can be any type of transient suppression elements, such as metal oxide varistors (MOV) or zener diodes. The varistor 7 is connected by a cable 7a to the electronic equipment 8. The electronic equipment 8 can be radio equipment, television equipment, other broadcasting equipment or other electronic items that receive and/or broadcast signals through antenna 2.

As can be seen, the various components of the system 1 of the present invention are connected to the grounding bus 9. Typically, copper wire will form the conductive lines 9a, 9c, 9d and 9e which serve to connect the various components to the grounding bus 9. In the preferred embodiment of the present invention, the grounding bus 9 is a 400 amp copper grounding bus. The grounding bus 9 is connected by the conductive line 10a to the ground rod 10. Conductive line 9a, in the preferred embodiment of the present invention, is 350 MCM or 4 #2 solid tinned copper wire. The ground rod 10 is inserted into the earth so as to discharge the lightning strikes into the earth. The ground rod 10 has a particular configuration, such as that illustrated in FIG. 7 and described hereinafter.

Figure 4:
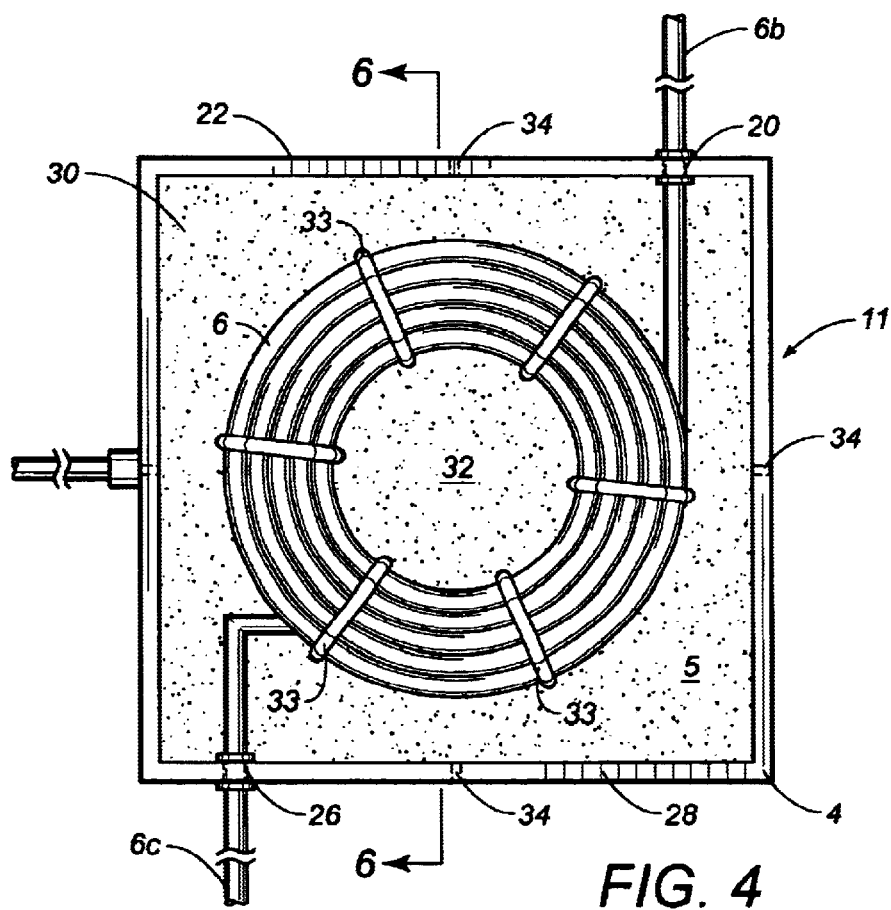
FIG. 4 is a cross-sectional view showing the interior of the lightning suppression attenuator enclosure in accordance with the teachings of the present invention.

Referring to FIG. 4, there is shown at 11 the lightning suppression attenuator in accordance with the teachings of the present invention. The lightning suppression attenuator 11 includes enclosure 4 having an interior volume 5 and a coil 6 of conductive coaxial cable received within the interior volume 15 of the enclosure 4. The coil 6 has a first lead 6b extending outwardly of a first opening 20 in the wall 22 of the enclosure 14. The coil 6 has a second lead 6c extending outwardly of an opening 26 formed in another wall 28 of the enclosure 4.

As can be seen in FIG. 4, the enclosure 4 is a box formed of a polyvinyl chloride (PVC) material. In the preferred embodiment of the present invention, the enclosure 12 is eight inches wide by eight inches long and by four inches deep. As will be described hereinafter, a cover is positioned over the top surface of the enclosure 4. A conductive grit material 30 (shown with greater particularity in FIG. 6) resides on the bottom of the enclosure 4 within the interior volume 5. The coil 6 is located in the center of the enclosure 4 and upon the grit 30.

The coil 6 is, in the preferred embodiment of the present invention, a coil of RG-8 or armored super flex shielded cable. Coil 6 is formed of several turns of the wire around a void 32 formed in the center of the coil 6. First lead 6b and second lead 6c extend outwardly of the enclosure 4. Cinch straps 33 serve to secure the coil 6 together around the central void 32. These cinch straps 33 are positioned at sixty degree arc intervals around the circumference of coil 6. The coil 6 is dipped in glyptal and dried for twenty-four hours.

After the coil 6 is installed upon the layer 30 of conductive grit, the remainder of the enclosure 4 is filled with another coarse steel grit to within one-half inch from the top of the enclosure 4. As can be seen in FIG. 4, holes 34 are formed in each of the walls of the enclosure 4. Holes 34 allow an expandable foam, such as polyurethane, to be injected into the interior volume 5 so as to extend around the conductive grit within the enclosure 4 and over and around the coil 6. As such, the interior volume 5 will be completely sealed.

Figure 5:
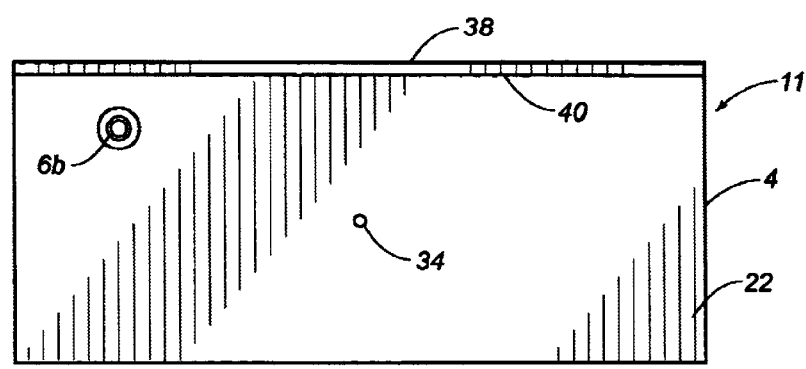
FIG. 5 is a side elevational view of the lightning suppression attenuator of the present invention.

FIG. 5 shows the exterior view of the enclosure 4 at side 22. As can be seen, a lid 38 is affixed onto the top opening 40 of the enclosure 4. In particular, the lid can be screwed onto the top 40 of the enclosure 4 so as to securely seal the interior volume 5. The hole 34 allows the expandable foam to be injected into the interior volume 5. Opening 20 is also formed on wall 22. The first lead 6b is illustrated as extending outwardly of the opening 20. Watertight connector 42 extends around the lead 6b within the hole 20 so as to provide a liquid-tight seal between the hole 20 and the lead 6b. A similar arrangement of seal is provided in association with opening 26 formed on wall 28 of the enclosure 12.

Figure 6:
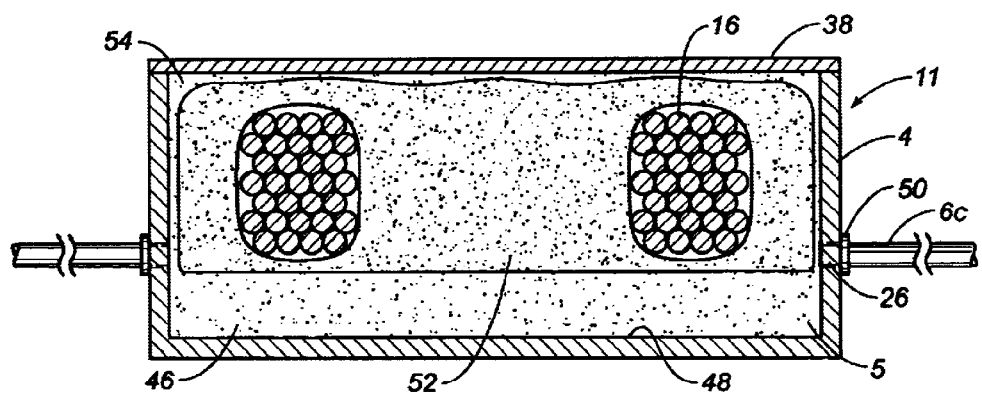
FIG. 6 is a cross-sectional view of the lightning suppression attenuator as taken across lines 6—6 of FIG. 4.

Referring to FIG. 6, the interior configuration of the lightning suppression attenuator 11 is particularly shown. The enclosure 4 has lid 38 affixed thereover. The interior volume 5 includes a first layer 46 of coarse steel grit residing upon the bottom 48 of the enclosure 4. The coil 6 is then placed upon the top of the layer 46. The second lead 6c of the coil 6 extends outwardly through opening 26. Seal 50 surrounds the exterior of the lead 6c so as to provide a liquid-tight seal with the second opening 26.

Another layer 52 of coarse steel grit is then placed upon the first layer 46 and over and around the coil 6. The expandable foam material 54 will extend around the grit 52 and around the coil 6 so as to fully seal the coil 6 within the interior volume 5 of enclosure 4.

Figure 7:
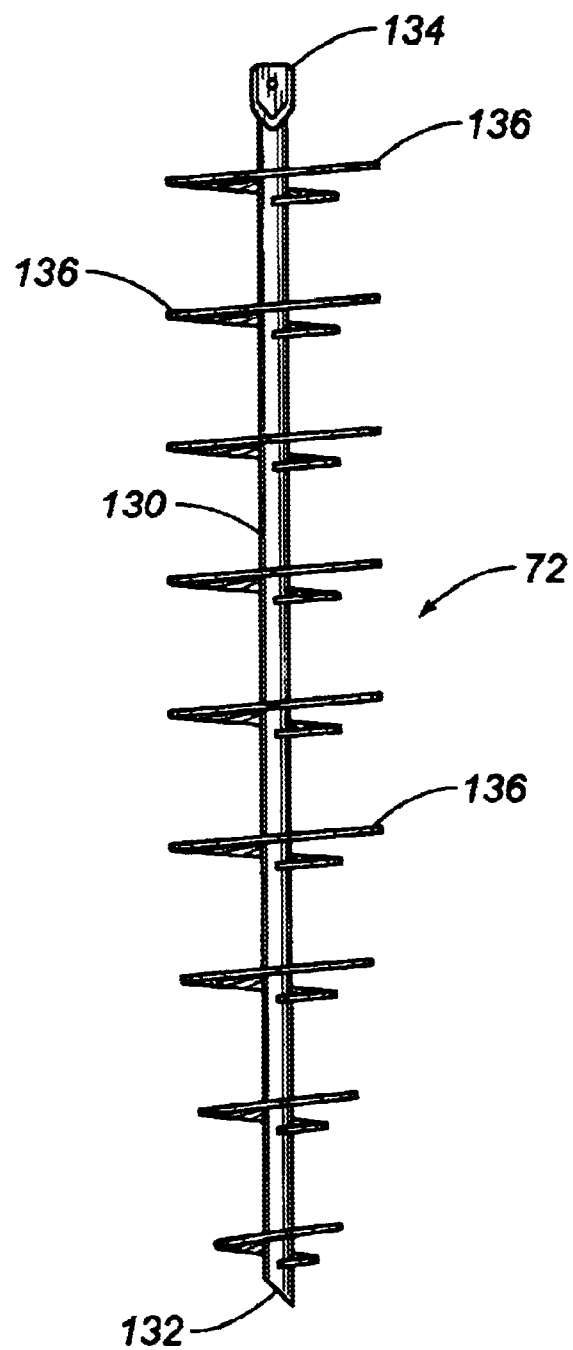
FIG. 7 is a side elevational view showing the grounding rod as used in the present invention.

FIG. 7 illustrates, in detail, the particular configuration of grounding rod 72 as used in the present invention. It can be seen that the grounding rod 72 has a central shaft 130 that extends from the pointed base 132 to the connection point 134. A plurality of spiral-shaped vanes 136 are positioned in spaced relationship longitudinally along the length of the shaft 130. Each of the spiral-shaped vanes 136 creates the "digging" action of the grounding rod 72. By rotating the grounding rod 72, the vanes 136 will engage the earth so as to draw the grounding rod 72 into the earth. The connection point 134 can be connected to a suitable rotational mechanism. After removal from the rotational mechanism, the connection point 134 can be used as the contact point for the electrical lines. As can be seen, the great surface area along each of the vanes 136 and along the shaft 130 establishes strong electrical connections between the grounding rod 72 and the earth. A carbon electrolyte can be placed over the surfaces of the grounding rod 72 so as to further establish a strong electrical connection.

The present invention provides significant protection for the electronic equipment 8. In particular, when a lightning strikes affects the antenna 2 or the coaxial cable 3, the lightning wavefront will be sufficiently "cushioned" or absorbed by the lightning suppression attenuator 11 in combination with the grounding rod 10. Typically, the lightning wavefront will travel along the central conductor 3b and the outer conductive shield 3c. Before the lightning wavefront affects the varistor 7 or the electronic equipment 8, the lightning will pass through the lightning suppression attenuator 11 so as to generate counter EMF forces within the coil 6. These counter EMF forces will dissipate the lightning in the form of heat. The heat will be dissipated through the steel shot within the interior volume 5 of the enclosure 4. Any residual electrical charges are discharged through the conductive lines 9a, 9c and 9b to the grounding bus 9. As such, the lightning strikes will be dumped to ground.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

We claim:

1. A system for suppressing the effects of lightning comprising:

an antenna;

a cable extending from said antenna;

an enclosure having an interior volume;

a coil of conductive wire received within said interior volume of said enclosure, said coil having a first lead and a second lead extending outwardly of said enclosure, said first lead connected to said cable;

an electronic equipment suitable for receiving from or transmitting through said antenna, said electronic equipment interconnected to said second lead; and a conductive grit filling a portion of said enclosure.

2. The system of claim 1, said conductive grit being steel shot.

3. The system of claim 1, further comprising:

a grounding rod electrically connected to at least one of said cable said enclosure and said electronic equipment.

4. The system of claim 3, said grounding rod comprising:

a central shaft; and a plurality of vanes extending radially outwardly from said central shaft, said central shaft and said plurality of vanes being of a conductive material.

5. The system of claim 3, said cable being a coaxial cable having a central conductor and an outer conductive shield, said coaxial cable having a connector affixed to an end thereof, the system further comprising:

a conductive line interconnected to said connector of said coaxial cable and to said grounding rod.

6. The system of claim 1, said cable being a coaxial cable having a central conductor and an outer conductive shield, said coaxial cable having a connector affixed to an end thereof.

7. The system of claim 6, said coil of conductive wire being a coaxial line affixed to said connector of said cable.

8. The system of claim 1, said cable being a heliaxial cable.

9. The system of claim 1, further comprising:

a varistor connected to said second lead of said coil, said electronic equipment connected to said varistor.

10. The system of claim 9, further comprising:

a grounding rod electrically connected to said electronic equipment and to said varistor.

11. The system of claim 1, further comprising:

a grounding bus having a first conductive line connected to said cable, a second conductive line connected to said enclosure and a third conductive line connected to said electronic equipment; and a grounding rod having a conductive line connected to said grounding bus.

12. The system of claim 11, further comprising:

a varistor connected to said second lead of said coil, said electronic equipment connected to said varistor, said varistor having a conductive line connected to said grounding bus.

13. A lightning suppression apparatus for an antenna cable comprising:

an enclosure having an interior volume;

a coil of conductive cable received within said interior volume of said enclosure, said coil having a first lead and a second lead extending outwardly of said enclosure, said coil having said first lead with an end suitable for connection to the antenna cable, said second lead suitable for interconnection to an electronic equipment; and a conductive material filling a portion of said enclosure around said coil of conductive cable.

14. The apparatus of claim 13, further comprising:

grounding rod electrically interconnected to said enclosure.

15. The apparatus of claim 14, said grounding rod comprising:

a central shaft; and a plurality of vanes extending radially outwardly from said central shaft, said central shaft and said plurality of vanes being of a conductive material.

16. The apparatus of claim 14, further comprising:

a grounding bus having a conductive line connected to said enclosure and another conductive line connected to said grounding rod.

17. The apparatus of claim 13, said coil being a coaxial cable.

18. The apparatus of claim 13, said coil being a heliaxial cable.

* * * * *